United States Patent [19]

Po' et al.

[11] Patent Number: 5,644,019

[45] Date of Patent: Jul. 1, 1997

[54] HIGH ACTIVITY CATALYTIC SYSTEM FOR THE SYNTHESIS OF POLY(ETHYLENE TEREPHTHALATE)

[75] Inventors: Riccardo Po', Livorno; Luigi Pelosini, Fontaneto D'Agogna; Ernesto Occhiello, Novara; Luisa Fiocca, Florence, all of Italy

[73] Assignee: Enichem S.p.A., Milan, Italy

[21] Appl. No.: 650,833

[22] Filed: May 20, 1996

[30] Foreign Application Priority Data

Jun. 1, 1995 [IT] Italy .................. MI95A1141
Aug. 4, 1995 [IT] Italy .................. MI95A1728
Aug. 9, 1995 [IT] Italy .................. MI95A1765
Sep. 29, 1995 [IT] Italy .................. MI95A1992

[51] Int. Cl.$^6$ .................................................. C08G 63/02
[52] U.S. Cl. ............... 528/272; 264/176.1; 264/177.13; 264/299; 264/328.1; 428/34.1; 502/150; 502/200; 502/202; 502/232; 525/437; 525/444; 528/296; 528/298; 528/299; 528/302; 528/305; 528/307; 528/308

[58] Field of Search ....................... 528/272, 296, 528/298, 299, 302, 305, 307, 308

[56] References Cited

U.S. PATENT DOCUMENTS 5,252,282  10/1993  Po' et al. ..................... 264/177.13
5,266,676  11/1993  Po' et al. ..................... 528/272

*Primary Examiner*—Terressa Mosley
*Attorney, Agent, or Firm*—Oblon, Spivak, McClelland, Maier & Neustadt, P.C.

[57] ABSTRACT

In the present invention, a class of catalysts is described, to be used in the polycondensation stage in the synthesis of poly(ethylene terephthalate), constituted by a composition of metal derivatives in quantity so that the content of these in the final polymer is below 130 ppm.

17 Claims, No Drawings

HIGH ACTIVITY CATALYTIC SYSTEM FOR THE SYNTHESIS OF POLY(ETHYLENE TEREPHTHALATE)

The present invention concerns a class of catalysts to be used in the polycondensation stage during the synthesis of poly(ethylene terephthalate). Poly(ethylene terephthalate) (PET) is a thermoplastic polyester used in the production of textile fibers, containers and film for food use, supports for magnetic tapes and photographic films. It is industrially compounded through a multi stage synthesis of ethylene glycol and terephthalic acid or dimethyl terephthalate, in the presence of the proper catalysts.

PET is synthesized in two stages. During the first stage (scheme 1), dimethyl terephthalate (DMT) reacts in the presence of alcoholysis catalysts in order to give a mixture of oligomers, the main component of which is bis-(2-hydroxyethyl) terephthalate (BHET).

Due to improvements in the purification of terephthalic acid and because it costs less than DMT, in recently perfectioned processes, terephthalic acid instead of ester is used as raw material. In this case the reaction of the first stage (scheme 2) is an esterification (the result also in this case is BHET). BHET obtained in either of the two ways explained is transformed (scheme 3 polycondensation) in poly(ethylene terephthalate).

Scheme 1

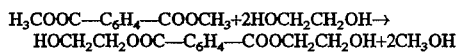

Scheme 2

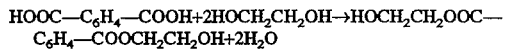

Scheme 3

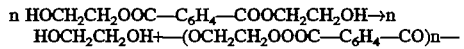

The optimum characteristics of a polycondensation catalyst are:

a) high activity, during the polymerization both in the melted and in the solid condition, suitable to provide reaction timings compatible with the industrial production processes and in the same time suitable to be used in the most limited quantity as possible;

b) absence of secondary reactions, such as the formation of diethylene glycol (DEG) and of acetaldehyde, the generation of unwanted colorations in the final material, the formation of final carboxylic groups. Particularly for the application in the field of textile fibers a polymer with a content of DEG as low as possible is preferable.

c) atoxicity, because in many applications PET touches foods.

d) contained costs.

Patent literature describes a wide range of inorganic, organic and organometal compounds which are efficient in catalyzing the polycondensation reaction.

Since the discovery of PET catalysts represented by antimonium compounds are described, especially oxide, acetate and alcoholates. It is however known that in order to obtain reaction kinetics sufficiently fast it is fundamental to use said compounds in quantities so that at the end of the reaction PET contains 200–300 ppm of metal. Which is undesirable for polymer applications to food containers.

Titanium compounds have a very high activity, though they cause the formation of a yellow coloring in the final material due to the formation of acetaldehyde and of degradation products (J. M. Besnoin and K.Y. Choi, J. Macromol. Sci., Rev. Macrotool. Chem. Phys., C29, 55 (1989)). Mixtures of titanium compounds with other metallic derivatives, such as cobalt, manganese and magnesium, nickel, zinc, lanthanum, tin and others are described. Germanium derivatives represent another considerable class of polycondensation catalysts. The weakness of germanium derivatives consists in the incredibly high cost and a higher toxicity than antimonium. Combinations of titanium and germanium are reported in several patents. Another metal which gives derivatives provided with catalytic activity is tin, though tin derivatives have a quite reduced activity, and they also cause the dark-yellow coloring of the polymer.

The protonic acids have a moderate catalytic activity, and cause the di- and trimerization of ethylene glycol, which remains in the chain of the final polymer drastically lowering its fusion temperature, until making it in some cases completely amorphous, and reducing its thermic and hydrolyric stability. The compounds described are sulphuric acid and acids, esters, arthydrides, and sulphonic amides.

None of these systems presents the above described characteristics of high activity, atoxicity and absence of secondary reactions in the same time.

In a recent Italian patent application IT-A-9402585 a catalyst is described, which is constituted by a mixture of sulphonic acid, titanium and eventually antimonium in order to obtain a PET with characteristics (atoxicity and absence of secondary reactions) useful to produce bottles and preforms for bottles. In the mentioned patent, however, the quantity of DEG in some cases is above 1%, which makes the polymer unsuitable for the production of fiber.

The applicant has by now discovered a catalytic system, to be used in the polycondensation stage of the synthesis of poly(ethylene terephthalate), which overcomes any eventual disadvantage of the already known catalysts in the field, and which seems to possess the set of characteristics which, as already mentioned, determine an optimal behavior of the catalyst.

According to this, the task of the present invention is the creation of a catalytic system suitable to catalyze the polymerization of bis(2-hydroxyethyl)terephthalate or its homologous oligomers characterized by the fact that it includes:

a compound of formula

 (I)

its anhydride, wherein

Z is OH, OM, OR', NR"$_2$, while M is a simple or complex metallic ion mono- or bi- or tri- or tetravalent or otherwise an organic ion;

A is P, S, B, Si, As, or C, in this case R is an alkyl perfluorate group; R, R', R"$_2$, equal or different one from the other, are radicals, containing up to 20 atoms of carbon, selected among alkyl or aryl, linear or branched, saturated cyclic or aromatic m is 0, 1 or 2 y is equal or above 1 x is equal or above 0;

one among antimonium or germanium derivatives in quantities so that antimonium or germanium in the final polymer is between 5 and 130 ppm;

a titanium derivative in quantities so that titanium in the final polymer is between 0 and 20 ppm;

while the metal content deriving from said catalytic system of polycondensation in the final polymer is below 130 ppm.

In another embodiment of the same invention, the catalytic system, when the titanium derivative is 0, it additionally contains a tin derivative in quantities so that tin in the residual polymer is between 1 and 50 ppm.

In the most favourite conditions x is at least equal to 1.

Examples of compounds with formula (I) with x equal or above 1 are p-toluensulphonic acid, naphtalensulphonic acids, ethansulphonic acid, propansulphonic acid, cycloexansulphonic acid. Sulphonic aromatic acids are to be preferred, such as benzensulphonic acid, p-toluensulphonic acid, naphtalensulphonic acids or derivatives of sulphonic acids, such as anhydfides, esters and amides. Phenylsulphonic acid and phenylboronic acid are examples of phosphonic and boronic acids to be preferred. Examples of compounds with x equal to 0 are trialkyl or triarylphophinoxides and trialkyl or triarylborates.

According to the typical procedure during the first stage (scheme 1), dimethyl terephthalate (DMT) reacts at atmospheric pressure and at a temperature of about 160°–190° C. with ethylene glycol in excess (2–2.2:1 in moles) in the presence of alcoholysis catalysts in order to provide a mixture of oligomers the main constituent of which is represented by bis-(2-hydroxyethyl) terephthalate (BHET). In the reaction methanol is released as a residual product. The most commonly used catalysts for the alcoholysis stage are magnesium, cobalt, manganese, zinc, calcium and other acetates and titanium acoholates.

Terephthalic acid can be used as raw material instead of ester. In this case the first stage reaction (scheme 2) is an esterification (also in this case the product is BHET), and water is the reaction residual product distilled; the reaction is carried out under slight pressure and at temperatures some tens of degrees higher than in the case of DMT reaction. In this case no catalyst is normally used. The reaction mixture can eventually contain comonomers in small quantities (0.1–5% in moles).

BHET obtained by means of one of the two procedures described is transformed (scheme 3) in poly(ethylene terephthalate) at temperatures of 260°–290° C. and pressures below a millibar in the presence of stabilizers and of polycondensation catalysts object of the invention. During the reaction ethylene glycol is removed by distillation. The stabilizers (phosphoric acid, trimethyl phosphate, triphenyl phosphate or the correspondent phosphites) have the function of deactivating the catalyst of the first stage (when used) and of avoiding the verification of unwanted secondary reactions.

The quantity of formula (I) compound to be used provides a polyester containing A expressed as sulfur, boron, silicium or elementary arsenic in quantities which do not exceed 30 ppm, preferably below 10 ppm. Examples of formula (I) compounds useful to put the present invention into effect are sulphonic, sulfinic, phosphonic, phosphinic, boronic, arsonic and other acids or their salts, esters, amides or anhydrides. Derivatives of antimonium, germanium and tin can be of different types, provided that they are soluble in the reaction medium.

Said elements can be especially used as oxides, inorganic salts, carboxylates (particularly acetates), alcoholates (particularly glycolates, methylates, ethylates, isopropylates or butylates) or sulfonates (particularly benzenesulfonates, toluensulfonates, naphtalensulfonates). Antimonium acetate or oxide, dibutyltin oxide, germanium oxide, butylated (or ethylated or isopropylated) titanium are particularly indicated.

Catalytic systems thus conceived have the following characteristics:

a) they have high activity during the polymerization both in melted and in solid condition.

b) They do not cause widely spread secondary reactions, as shown by the color of the final polymer and by the levels of diethylene glycol and of acetaldehyde.

c) They contribute to the presence of heavy metals in quantities below 130 ppm.

d) They have a contained cost.

The polymer obtained with these catalytic systems is characterized by the following parameters.

1. Intrinsic viscosity (IV) is measured on polymeric solution in phenol-tetrachloroethane with a ratio of 60:20 in weight at 30° C. by means of Shotte-Gerate automatic viscometer.

2. The metal content is defined in terms of ppm of metal in the final polymer, according to the quantity of catalysts weighed and introduced in the reaction mixture.

3. The content of diethylene glycol (DEG) consists of DEG percentage in weight contained in the polymer and determined by gas-chromatographic analysis of the PET hydrolysis products, according to the procedure of Allen B. J. in Anal. Chem. vol 49 pg 741, 1977.

4. Acetaldehyde release. The polymer is grinded under liquid nitrogen and treated at 150° C. for 20 minutes. Acetaldehyde, released for the permanence of the polymer at 280° C. for 5 min, is measured by thermal desorption together with the gas-chromatographic analysis.

Due to these properties PET obtained is particularly fit for the production of textile fibers because the low content of metals reduces the fouling of spinnerets, though it can also be used for the production of films or containers for liquids.

The following examples are reported for a better comprehension of the invention and are not to be intended as a limit to it.

The characterization data of the polymer prepared as described in examples 1–11 are reported in table 1.

The characterization data of the polymer prepared as described according to examples 12–13 are reported in table 2.

EXAMPLE 1

19.4 kg (100 moles) of dimethylterephthalate are introduced in a 40 l steel reactor in inert atmosphere together with 13.64 kg (220 moles) of ethylene glycol and 100 ml of a glycolic solution containing 0.70 g of manganese tetrahydrate acetate, 3.06 g of magnesium tetrahydrate acetate, 1.25 g of zinc dihydrate acetate, 2.84 g of cobalt tetrahydrate acetate and 1.64 g of sodium benzoate. The temperature of the reaction mixture is increased to 180 ° C. and maintained for about 4 hours until the methanol distillation is complete, then the temperature is increased to 225° C. The polycondensation catalyst constituted by the following mixture is added 0.84 g of dibutyltin oxide, 1.84 g of monohydrate p-toluensulphonic acid, 1.92 g of antimonium trioxide in glycolic solution.

Pressure is then gradually reduced to 0.6 torr and the temperature is increased to 285° C., maintaining these conditions for 2 hours and 10 minutes; during all this time ethylene glycol in excess is removed. After restoring atmospheric pressure of the device with N2, the polymer is extruded and grinded.

EXAMPLE 2

A polymer is prepared by using the same procedures and the reactives as in example 1, though using the following mixture as catalyst:

0.42 g of dibutyltin oxide, 1.84 g of monohydrate p-toluensulphonic acid, 1.92 g of antimonium trioxide, 6.3 g of phosphoric acid.

The duration of the reaction at 285° C. is 3 hours and 25 minutes.

EXAMPLE 3

A polymer is prepared by using the same procedures and reactives as in example 1, though using the following mixture as catalyst.

1.68 g of dibutyltin oxide 2.30 g of monohydrate p-toluensulphonic acid, 1.44 g of antimonium trioxide, 6.3 g of phosphoric acid.

The duration of the reaction is 3 hours and 5 minutes.

EXAMPLE 4

A polymer is prepared by using the same procedures and reactives as in example 1, though using the following mixture as catalyst.

1.26 g of dibutyltin oxide 1.84 g of monohydrate p-toluensulphonic acid 1.92 g of antimonium trioxide 6.3 g of phosphoric acid.

The duration of the reaction is 2 hours and 50 minutes.

EXAMPLE 5

A polymer is prepared by using the same procedures and reactives as in example 1, though adding the catalyst mixture to the glycolic solution before increasing the reaction temperature to 180° C. Moreover the temperature is maintained at 285° C. for 2 hours and 30 minutes.

The catalyst is the following:

0.84 g of dibutyltin oxide, 3.93 g of antimonium acetate.

After the temperature has reached 225° C. 0.92 g of monohydrate p-toluensulphonic acid and 1.89 g of phosphoric acid are added.

The duration of the reaction is 3 hours and 45 minutes.

EXAMPLES 6–7 (comparative)

A polymer is prepared by using the same procedures and reactives as example 1, though using the following mixtures as catalyst/stabilizer system.

Example 6:

7.36 g of antimonium trioxide 10 g of trimethylphosphate.

Example 7:

3.68 g of antimonium trioxide 10 g of trimethylphosphate

The duration of the reaction in both examples is 2 hours and 50 minutes.

The final material has a gray color and contains high levels of acetaldehyde.

EXAMPLES 8–10 (comparative)

A polymer is prepared by using the same procedures and reactives as in example 1, though using the following mixtures as catalyst/stabilizer system.

Example 8:

2.76 g of antimonium trioxide, 10 g of trimethylphosphate.

Example 9:

1.84 g of antimonium trioxide 10 g of trimethylphosphate

Example 10:

6.72 g of dibutyltin oxide, 6.3 g of phosphoric acid.

The reaction timings are respectively in the three examples: 3 hours and 10 min, 5 hours, 3 hours and 20 min.

The activity of the catalyst is extremely low.

EXAMPLE 11 (comparative)

A polymer is prepared by using the same procedures and reactives as in example 1, though using the following mixture as catalyst/stabilizer system:

36.8 g of hydrate p-toluensulphonic acid 10 g of trimethyl phosphate

The polymer contains high quantities of di- and triethylenglycol, which determine a drastic upsetting of the properties (absence of melting point).

EXAMPLE 12

19.40 kg (100 moles) of dimethyl terephthalate are introduced in a 40 l steel reactor in inert atmosphere together with 13.64 kg (220 moles) of ethylene glycol and a glycolic solution containing: 0.70 g of manganese tetrahydrate acetate, 3.06 g of magnesium tetrahydrate acetate, 1.25 g of zinc dihydrate acetate, 2.84 g of cobalt tetrahydrate acetate, 1.64 g of sodium benzoate.

The reaction mixture temperature is increased to 180° C. and maintained for about 4 hours until the distillation of methanol is complete, and afterwards the temperature is increased to 225° C. In glycolic solutions the following are added: 0.12 g of titanium tetraisopropoxide, 0.92 g of monohydrate p-toluensulphonic acid, 3.84 g of antimonium trioxide, 6.30 g of phosphoric acid.

Pressure is then gradually reduced to 0.6 torr and temperature is increased to 285° C. After 2 hours and 30 minutes of reaction the device is restored to atmospheric pressure with N2 and the polymer is extruded and grinded.

EXAMPLE 13

A polymer is prepared with the same procedures and reactives described in example 12, with the difference that the catalyst system is constituted by a glycolic solution containing: 0.23 g of tetraisopropylate titanium, 1.84 g of monohydrate p-toluensulphonic acid, 2.88 g of antimonium trioxide, 1.9 g of phosphoric acid.

Pressure is gradually reduced to 0.6 torr and temperature is increased to 285° C. After 2 hours of reaction the pressure of the device is restored with N2 and the polymer is extruded and grinded.

EXAMPLE 14

In a 40 l steel reactor the following are introduced in inert atmosphere:

20 kg (103 moles) of dimethyl terephthalate, 14 kg (226 moles) of ethylene glycol in glycolic solution containing:

0.82 g of tetrahydrate Mn acetate, 3.38 g of tetrahydrate Mg acetate, 1.23 g of dihydrate Zn acetate, 2.62 g of tetrahydrate Co acetate.

The temperature of the reaction mixture is increased to 180° C. and maintained for 4 hours until the distillation of methanol is complete, then the temperature is increased to 225° C. and the following are added:

- 5.24 g of trimethyl phosphate
- 1.92 g of antimonium trioxide
- 0.57 g of Ti tetrahydrobutylated
- 1.98 g of Zn p-toluensulfonate in glycolic solutions. Pressure is gradually reduced to 0.6 torr and temperature increased to 285° C., maintaining these conditions for 1 hour and 45 minutes; during this time ethylene glycol in excess is removed. After restoring the device atmospheric pressure with nitrogen the polymer is extruded and grinded.

EXAMPLE 15

A sample in the same condition as in example 14 is prepared with the only exception that sodium p-toluensulfonate is used instead of zinc and that the temperature is increased to 285° C. is maintained at this value for 2 hours and 15 min.

EXAMPLE 16

In a 40 l steel reactor the following are introduced in inert atmosphere:

- 5 kg (26 moles) of dimethylterephthalate,
- 3.5 kg (53 moles) of ethylene glycol in glycolic solution containing:

- 0.20 g of tetrahydrate Mn acetate, 0.85 g of tetrahydrate Mg acetate, 0.31 g of dihydrate Zn acetate, 0.65 g of tetrahydrate Co acetate.

The temperature of the reaction mixture is increased to 180° C. and maintained there for 2 hours until the distillation of methanol is complete, and then cooled.

The following are added:

- 17 g (102 moles) of terephthalic acid
- 0 g (161 moles) of ethylene glycol and a glycolic solution containing:

- 0.82 g of tetrahydrate Mn acetate
- 3.38 g of tetrahydrate Mg acetate
- 1.23 g of dihydrate Zn acetate
- 2.62 g of tetrahydrate Co acetate.

The temperature of the reaction mixture is increased to 230° C. and maintained there for about 4 hours, until the distillation of water is complete, then the following are added:

- 5.24 g of trimethyl phosphate
- 1.92 g of antimonium trioxide
- 0.57 g of tetrabutylated titanium
- 1.89 g of sodium p-toluensulfonate in glycolic solutions. Pressure is then gradually reduced to 0.6 torr and temperature is increased to 285° C., maintaining these conditions for 2 hours and 20 minutes; during this time ethylene glycol in excess is removed. After restoring the atmospheric pressure of the device with nitrogen, the polymer is extruded and grinded.

EXAMPLE 17 (comparative)

The reaction is carried out as in example 14, though using 7.43 g of antimonium oxide instead of:

- 1.92 g of antimonium trioxide
- 0.57 g of tetrabutylated Ti
- 1.98 g of Zn p-toluensulfonate The duration of the reaction is 2 hours.

EXAMPLE 18 (comparative)

In a 40 l steel reactor the following are introduced in inert atmosphere:

- 19.4 kg (100 moles) of dimethylterephthalate,
- 13.64 kg (220 moles) of ethylene glycol and a glycolic solution containing:

- 0.70 g of tetrahydrate Mn acetate, 3.06 g of tetrahydrate Mg acetate, 1.25 g of dihydrate Zn acetate, 2.84 g of tetrahydrate Co acetate, 1.64 g of Na benzoate.

The temperature of the reaction mixture is increased to 180° C. and maintained there for 4 hours until the distillation of methanol is complete, then the temperature is increased to 225° C. and the following are added:

- 1.84 g of antimonium trioxide
- 0.69 g of tetraisopropylated Ti
- 10 g of trimethylphosphate in glycolic solutions. Pressure is then gradually reduced to 0.6 torr and temperature is increased to 285° C., maintaining these conditions for 4 hours and 45 minutes; during this time ethylene glycol in excess is removed. After restoring the device atmospheric pressure with nitrogen the polymer is extruded and grinded. The polymer has a yellow color.

EXAMPLE 19

In a 40 l steel reactor the following are introduced in inert atmosphere:

- 20 kg (103 moles) of dimethylterephthalate,
- 14 (226 moles) of ethylene glycol in a glycolic solution containing: 0.82 g of tetrahydrate Mn acetate, 3.38 g of tetrahydrate Mg acetate, 1.23 g of dihydrate Zn acetate, 2.62 g of tetrahydrate Co acetate.

The temperature of the reaction mixture is increased to 180° C. and maintained there for 4 hours until the distillation of methanol is complete, then the temperature is increased to 225° C. and the following are added:

- 1.92 g of antimonium trioxide
- 0.57 g of tetrabutylated Ti
- 5.24 g of trimethyl phosphate
- 1.95 g of disodic phenylphosphonate in glycolic solutions. Pressure is then gradually reduced to 0.6 torr and temperature is increased to 285° C., maintaining these conditions for 2 hours and 45 minutes; during this time ethylene glycol in excess is removed. After restoring the device atmospheric pressure with nitrogen the polymer is extruded and grinded, obtaining a polymer with intrinsic viscosity measured in phenol/tetrachloroethane 60:40 at 30° C. of 0.66 dl/g and a content of diethylene glycol of 0.80 in weight.

EXAMPLE 20

In a 40 l steel reactor the following are introduced in inert atmosphere:

- 0 kg (103 moles) of dimethyl terephthalate,
- 4 (226 moles) of ethylene glycol and a glycolic solution containing: 0.70 g of tetrahydrate Mn acetate, 3.06 g of tetrahydrate Mg acetate, 1.25 g of dihydrate Zn acetate, 2.84 g of tetrahydrate Co acetate, 1.64 g of sodic benzoate.

The temperature of the reaction mixture is increased to 190° C. and maintained there for 4 hours until the distillation of methanol is complete, then the temperature is increased to 220° C. and the following are added:

3.93 g of antimonium acetate
0.28 g of tetrabutoxide Ti
3.61 g of fenylboronic acid
6.3 g of phosphoric acid in glycolic solutions. Pressure is then gradually reduced to 0.6 torr and temperature is increased to 285° C., maintaining these conditions for 2 hours and 45 minutes; during this time ethylene glycol in excess is removed. After restoring the device atmospheric pressure with nitrogen the polymer is extruded and grinded, obtaining a polymer with intrinsic viscosity measured in phenol/tetrachloroethane 60:40 at 30° C. of 0.60 dl/g.

TABLE 1

| EXAMPLE | I.V. dl/g | DEG weight % | $CH_3CHO$ microgr/g |
|---|---|---|---|
| 1 | 0.51 | 0.66 | 57 |
| 2 | 0.59 | 0.92 | 15 |
| 3 | 0.61 | 0.96 | 36 |
| 4 | 0.61 | 0.72 | 14 |
| 5 | 0.64 | 0.50 | 28 |
| 6 | 0.67 | 0.70 | 51 |
| 7 | 0.66 | 0.74 | 45 |
| 8 | 0.50 | 0.51 | 34 |
| 9 | 0.30 | n.d. | 35 |
| 10 | 0.56 | 1.97 | 27 |
| 11 | n.d. | 16.0 | n.d.* |

*n.d. not determined

TABLE 2

| Example n° | t* hours | IV | DEG | Color |
|---|---|---|---|---|
| 12 | 2.40 | 0.62 | 0.48 | colorless |
| 13 | 2.00 | 0.69 | 0.82 | " |

*time measured from the moment in which a void of 1 torr is obtained in the reactor at the moment of the interruption of the reaction.

We claim:

1. Catalytic system to catalyze the polymerization of bis-(2-hydroxyethyl) terephthalate or its homologous oligomers which are formed upon the reaction of dimethyl terephthalate or terephthalic acid and ethylene glycol, comprising:

a compound of formula

$$Z_x-A(O)_m-R_y \qquad (I)$$

or its anhydride, where Z is OH, OM, OR', NR''$_2$;

M is a simple or complex metallic ion mono- or bi- or tri- or tetra-valent or an organic ion;

A is P, S, B, Si, As, or C, and when A is C, R is an alkyl perfluorate group;

R, R', R''$_2$, the same or different one from the other, are radicals, containing up to 20 atoms of carbon, selected from the group consisting of linear, branched and cyclic alkyl and aryl;

m is 0, 1 or 2;

y is equal or above 1;

x is equal or above 0;

an antimony or germanium derivative in quantities so that antimony or germanium in the final polymer is between 5 and 130 ppm;

a titanium derivative in quantities so that titanium in the final polymer is between 0 and 20 ppm;

wherein the metal content from said catalytic system in the final polymer is below 130 ppm.

2. Catalytic system according to claim 1 wherein, when the quantity of the titanium derivative is 0, said catalytic system additionally contains a tin derivative in quantities so that residual tin in the final polymer is between 1 and 50 ppm.

3. Catalytic system according to claim 2 wherein the tin derivative is a dialkyl tin derivative.

4. Catalytic system according to claim 2 wherein the tin derivative is an alcoholate.

5. Catalytic system according to claim 2 wherein the tin derivative is an oxide of dibutyl tin.

6. Catalytic system according to claim 1 wherein the compound of formula (I) is a sulphonic acid in quantity so that sulfur in the final polymer is between 0.1 and 50 ppm.

7. Catalytic system according to claim 6 wherein the sulphonic acid is p-toluensulphonic acid.

8. Catalytic system according to claim 6 wherein the sulphonic acid is benzensulphonic acid.

9. Catalytic system according to claim 6 wherein the sulphonic acid is naphtalensulphonic acid.

10. Catalytic system according to claim 1 wherein the compound of formula (I) is a phosphonic acid in quantity so that phosphorus in the final polymer is between 1 and 100 ppm.

11. Catalytic system according to claim 10 wherein the phosphonic acid is phenylphosphonic acid.

12. Catalytic system according to claim 1 wherein the compound of formula (I) is a boronic acid.

13. Catalytic system according to claim 12 wherein the boronic acid is phenylboronic acid.

14. Poly(ethylene terephthalate) obtained by using the catalytic system of claim 1, wherein said poly(ethylene terephthalate) contains metals from said catalytic system in quantity below 130 ppm.

15. A film comprising the poly(ethylene terephthalate) of claim 14.

16. A fiber comprising the poly(ethylene terephthalate) of claim 14.

17. A hollow casing comprising the poly(ethylene terephthalate) of claim 14.

* * * * *